United States Patent
Cheng

(10) Patent No.: US 9,215,109 B2
(45) Date of Patent: Dec. 15, 2015

(54) METHOD FOR EQUALIZING TRANSMISSION SPECTRUM OF A WIRELESS COMMUNICATION TRANSMITTER

(71) Applicant: REALTEK SEMICONDUCTOR CORP., Hsinchu (TW)

(72) Inventor: Ching-Chia Cheng, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 14/495,432

(22) Filed: Sep. 24, 2014

(65) Prior Publication Data

US 2015/0085911 A1    Mar. 26, 2015

(30) Foreign Application Priority Data

Sep. 24, 2013    (TW) .............................. 102134314 A

(51) Int. Cl.
*H04L 25/03* (2006.01)
*H04L 25/02* (2006.01)

(52) U.S. Cl.
CPC .... *H04L 25/03343* (2013.01); *H04L 25/03159* (2013.01); *H04L 25/0212* (2013.01)

(58) Field of Classification Search
CPC .................................................. H04L 25/0212
See application file for complete search history.

(56) References Cited

U.S. PATENT DOCUMENTS

| | | | |
|---|---|---|---|
| 5,636,244 A * | 6/1997 | Goodson et al. | 375/231 |
| 2003/0231716 A1* | 12/2003 | Unger | 375/296 |
| 2005/0053128 A1* | 3/2005 | Shearer et al. | 375/232 |
| 2008/0002652 A1* | 1/2008 | Gupta et al. | 370/338 |
| 2013/0070869 A1* | 3/2013 | Motamed et al. | 375/295 |

* cited by examiner

*Primary Examiner* — Shuwang Liu
*Assistant Examiner* — Ross Varndell
(74) *Attorney, Agent, or Firm* — Morris, Manning & Martin, LLP

(57) ABSTRACT

This disclosure provides a method for equalizing the transmission spectrum of a wireless communication transmitter. The method includes: providing a plurality of single-frequency signals; respectively inputting the plurality of single-frequency signals into the transmitter, wherein each single-frequency signal has a predetermined frequency and all the predetermined frequencies are different from each other; loopbacking the plurality of single-frequency signals to an analog to digital converter so as to generate a plurality of digital loopback signals; calculating a frequency response of the transmitter at base band circuit according to the plurality of digital loopback signals; and equalizing the transmission spectrum of the transmitter according to the frequency response of the transmitter.

8 Claims, 4 Drawing Sheets

METHOD FOR EQUALIZING TRANSMISSION SPECTRUM OF A WIRELESS COMMUNICATION TRANSMITTER

This application claims the benefit of Taiwan application Ser. No. 102134314, filed Sep. 24, 2013, the disclosure of which is incorporated by reference herein in its entirety.

TECHNICAL FIELD

The present disclosure relates to a method for equalizing the transmission spectrum of a wireless communication transmitter.

TECHNICAL BACKGROUND

In the telecommunication system, a transmitter usually includes an analog device, e.g. a power amplifier, with uneven characteristic frequency response in the transmitter circuit. This may result in a fact that the flatness of output spectrum of the transmitter cannot meet the requirements of wireless local area network (WLAN) standards, and even the distortions of memory effect. Such distortions make the transmitted signal, especially for a low power signal, affected by the nonlinear effect in the analog device.

Therefore, it is in need to develop a new method for equalizing the transmission spectrum of a wireless communication transmitter.

TECHNICAL SUMMARY

According to one aspect of the present disclosure, one embodiment provides a method for equalizing the transmission spectrum of a wireless communication transmitter, which includes: providing a plurality of single-frequency signals; respectively inputting the plurality of single-frequency signals into the transmitter, wherein each single-frequency signal has a predetermined frequency and all the predetermined frequencies are different from each other; loopbacking the plurality of single-frequency signals to an analog to digital converter so as to generate a plurality of digital loopback signals; calculating a frequency response of the transmitter at base band circuit according to the plurality of digital loopback signals; and equalizing the transmission spectrum of the transmitter according to the frequency response of the transmitter.

In one embodiment, the transmitter may include a power amplifier having an uneven frequency response.

In one embodiment, the method is for the Wi-Fi wireless local area network and each of the single-frequency signals may have a frequency selected from the group consisting of 5 MHz, 40 MHz, 80 MHz, −5 MHz, −40 MHz and −80 MHz.

In one embodiment, the transmitter may include a local oscillator and the step of calculating a frequency response of the transmitter at base band circuit may include: mixing the output of the transmitter in response to the inputted single-frequency signals with a signal from the local oscillator; and low-pass filtering the above mixing result.

According to one aspect of the present disclosure, another embodiment provides a method for equalizing the transmission spectrum of a wireless communication transmitter, which includes: providing a plurality of single-frequency signals and respectively inputting the plurality of single-frequency signals into the transmitter, wherein each single-frequency signal has a predetermined frequency and all the predetermined frequencies are different from each other; obtaining a baseband part of frequency response of the transmitter in response to the inputted single-frequency signals; performing an analog-to-digital conversion for the obtained baseband part of frequency response so as to obtain a baseband characteristic sequence G[k] of the transmitter; setting a equalizing sequence H[k] according to the baseband characteristic sequence G[k]; and applying inverse Fourier transform to the equalizing sequence H[k] and designing a pre-equalizer, to be arranged in the transmitter, according to the inverse-Fourier-transformed coefficients; wherein $k \in [0, K-1]$ and K is a predetermined number of samples.

In one embodiment, the equalizing sequence is $$H[k] = \begin{cases} \frac{G[0]}{G[k]}, & \text{for } k = 0 \sim \frac{K}{4} \text{ and } \frac{3K}{4} \sim (K-1) \\ H\left[\frac{K}{2} - k\right], & \text{for } k = \left(\frac{K}{4} + 1\right) \sim \frac{K}{2} \\ H\left[\frac{3K}{2} - k\right], & \text{for } k = \left(\frac{K}{2} + 1\right) \sim \left(\frac{3K}{4} - 1\right) \end{cases}$$

or $$H[k] = \begin{cases} \frac{G[0]}{G[k]}, & \text{for } k = 0 \sim \frac{K}{4} \text{ and } \frac{3K}{4} \sim (K-1) \\ 1, & \text{for } k = \left(\frac{K}{4} + 1\right) \sim \frac{K}{2} \\ 1, & \text{for } k = \left(\frac{K}{2} + 1\right) \sim \left(\frac{3K}{4} - 1\right) \end{cases}$$

In one embodiment, the transmitter may include a power amplifier having an uneven frequency response.

In one embodiment, the method is for the Wi-Fi wireless local area network and each of the single-frequency signals may have a frequency selected from the group consisting of 5 MHz, 40 MHz, 80 MHz, −5 MHz, −40 MHz and −80 MHz.

In one embodiment, the transmitter may include a local oscillator and the step of obtaining the baseband part of frequency response of the transmitter may include: mixing the output of the transmitter in response to the inputted single-frequency signals with a signal from the local oscillator; and low-pass filtering the above mixing result.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For further understanding and recognizing the fulfilled functions and structural characteristics of the disclosure, several exemplary embodiments cooperating with detailed description are presented as the following. Reference will now be made in detail to the preferred embodiments, examples of which are illustrated in the accompanying drawings.

In the following description of the embodiments, it is to be understood that when an element is stated as being "on" or "under" another element, it can be "directly" on or under another element or can be "indirectly" formed such that an intervening element is also present. Also, the terms such as "on" or "under" should be understood on the basis of the drawings, and they may be used herein to represent the relationship of one element to another element as illustrated in the figures. It will be understood that this expression is intended to encompass different orientations of the elements in addition to the orientation depicted in the figures, namely, to encompass both "on" and "under". In addition, although the terms "first", "second" and "third" are used to describe various elements, these elements should not be limited by the term. Also, unless otherwise defined, all terms are intended to have the same meaning as commonly understood by one of ordinary skill in the art.

Figure 1A:
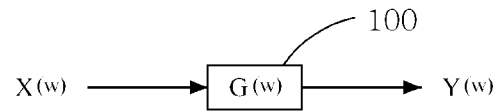
FIG. 1A shows a block diagram of a wireless communication transmitter.

FIG. 1A schematically shows a block diagram of a wireless communication transmitter 100, in which G(w) denotes the transmission spectrum, i.e. impulse response, of the transmitter 100 and w denotes angular frequency, i.e. w=2πf, and f denotes frequency. In the case that an input signal with its frequency spectrum X(w) is applied to the transmitter 100, the output signal has its frequency spectrum which can be represented by Y(w)=G(w)X(w). If the input signal is an unit impulse at angular frequency $w_s$, then it can be represented by X(w)=δ(w−$w_s$), where δ(w) denotes the impulse function of angular frequency w. When the impulse signal δ(w−$w_s$) is applied to the transmitter 100 as an input, a response of G($w_s$) can be obtained at the output of the transmitter 100.

Figure 1B:
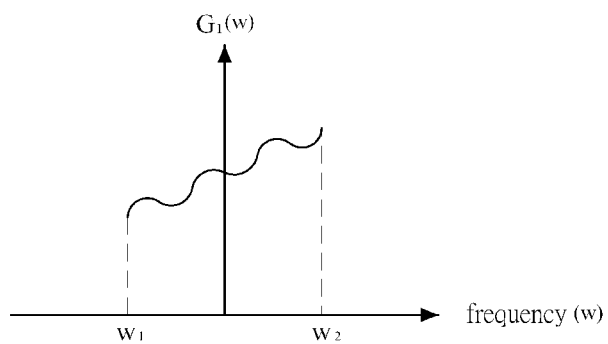
FIG. 1B shows a transmission spectrum of a prior-art transmitter.

Conventionally, a wireless communication transmitter has a power amplifier in its transmission path and the power amplifier is an analog device with uneven characteristic frequency response, so the characteristic frequency response $G_1(w)$ of a prior-art transmitter has an uneven transmission spectrum. For example, FIG. 1B shows a transmission spectrum of a prior-art transmitter, in which $G_1(w)$ has an inclined convexo-concave profile in the range between angular frequencies $w_1$ and $w_2$. The uneven transmission spectrum may cause distortions during the signal transmission.

Figure 1C:
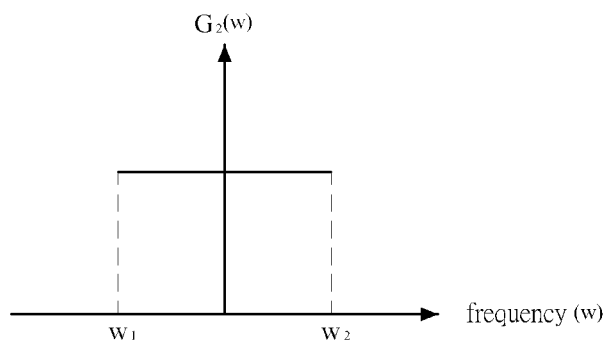
FIG. 1C shows a transmission spectrum of a transmitter with a flat impulse response in the range between frequencies $w_1$ and $w_2$.

This is the reasons why we intend in this disclosure to develop a new equalizing method which can compensate the above-mentioned uneven transmission spectrum in the prior-art transmitter. Taking the prior-art transmitter with its transmission spectrum $G_1(w)$ shown in FIG. 1B as an example, the embodiments of this disclosure are to equalize the transmission spectrum of the transmitter, so that the transmitter 100 has a flat impulse response $G_2(w)$ in the range between angular frequencies $w_1$ and $w_2$ as shown in FIG. 1C. Accordingly, a pre-equalizer with a characteristic frequency response H(w) can be added into the prior-art transmitter, so that it satisfies the mathematical relation $G_2(w)=H(w)G_1(w)$. Due to the flat frequency spectrum of $G_2(w)$ in the range between angular frequencies $w_1$ and $w_2$, H(w) and $G_1(w)$ satisfy the mathematical relation $$H(w) = \frac{G_0}{G_1(w)},$$

where $G_0$ denotes a constant of scaling ratio.

Figure 2:
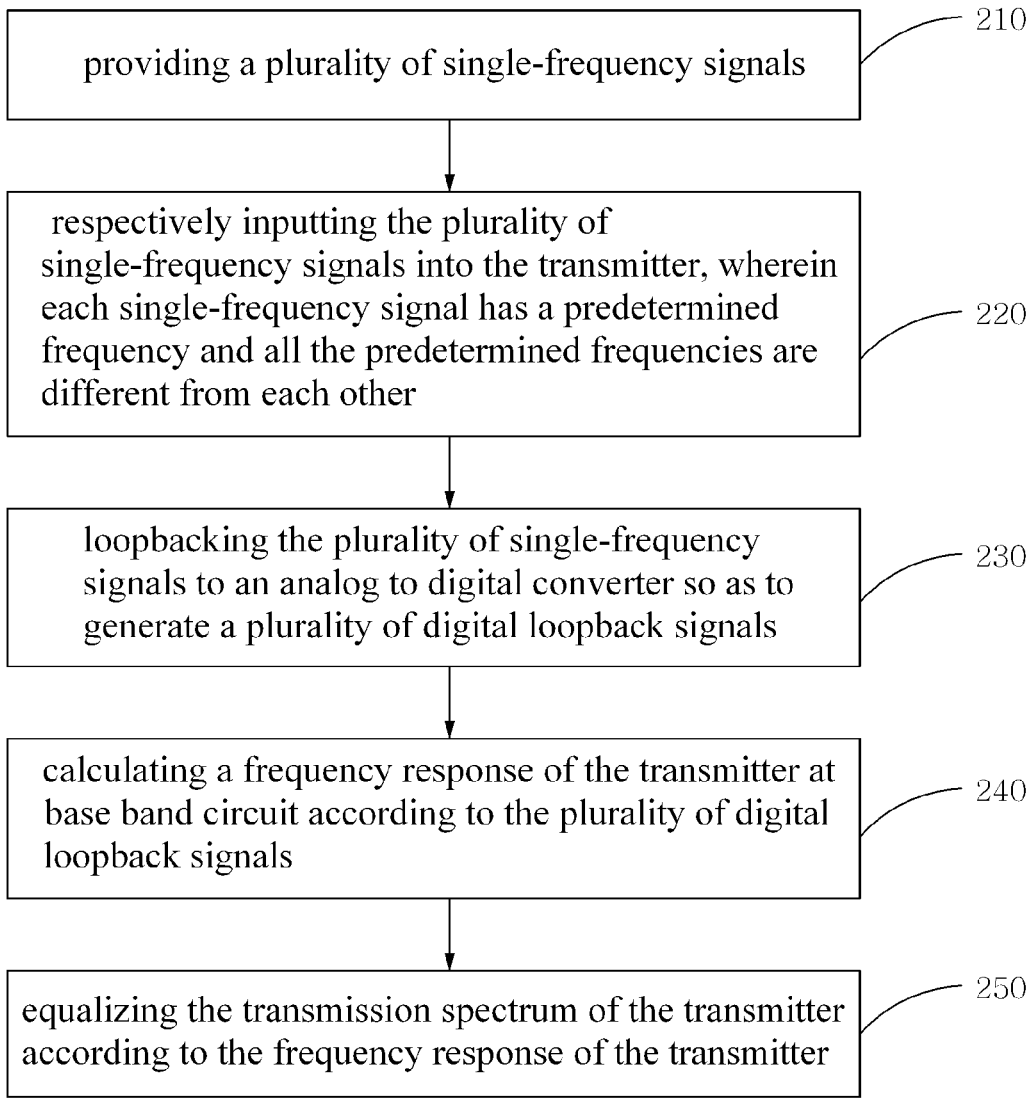
FIG. 2 shows a flow chart of an equalizing method according to one embodiment of the present disclosure.

FIG. 2 shows a flow chart of an equalizing method 200 according to one embodiment of the present disclosure. The equalizing method 200 is used to equalize the transmission spectrum or impulse response of a wireless communication transmitter. The transmitter may include a power amplifier having an uneven characteristic frequency response in its transmission path, and this leads to an uneven transmission spectrum of the transmitter. The equalizing method 200 includes the steps of: (Step 210) providing a plurality of single-frequency signals; (Step 220) respectively inputting the plurality of single-frequency signals into the transmitter, wherein each single-frequency signal has a predetermined frequency and all the predetermined frequencies are different from each other; (Step 230) loopbacking the plurality of single-frequency signals to an analog to digital converter so as to generate a plurality of digital loopback signals; (Step 240) calculating a frequency response of the transmitter at base band circuit according to the plurality of digital loopback signals; and (Step 250) equalizing the transmission spectrum of the transmitter according to the frequency response of the transmitter.

Figure 3:
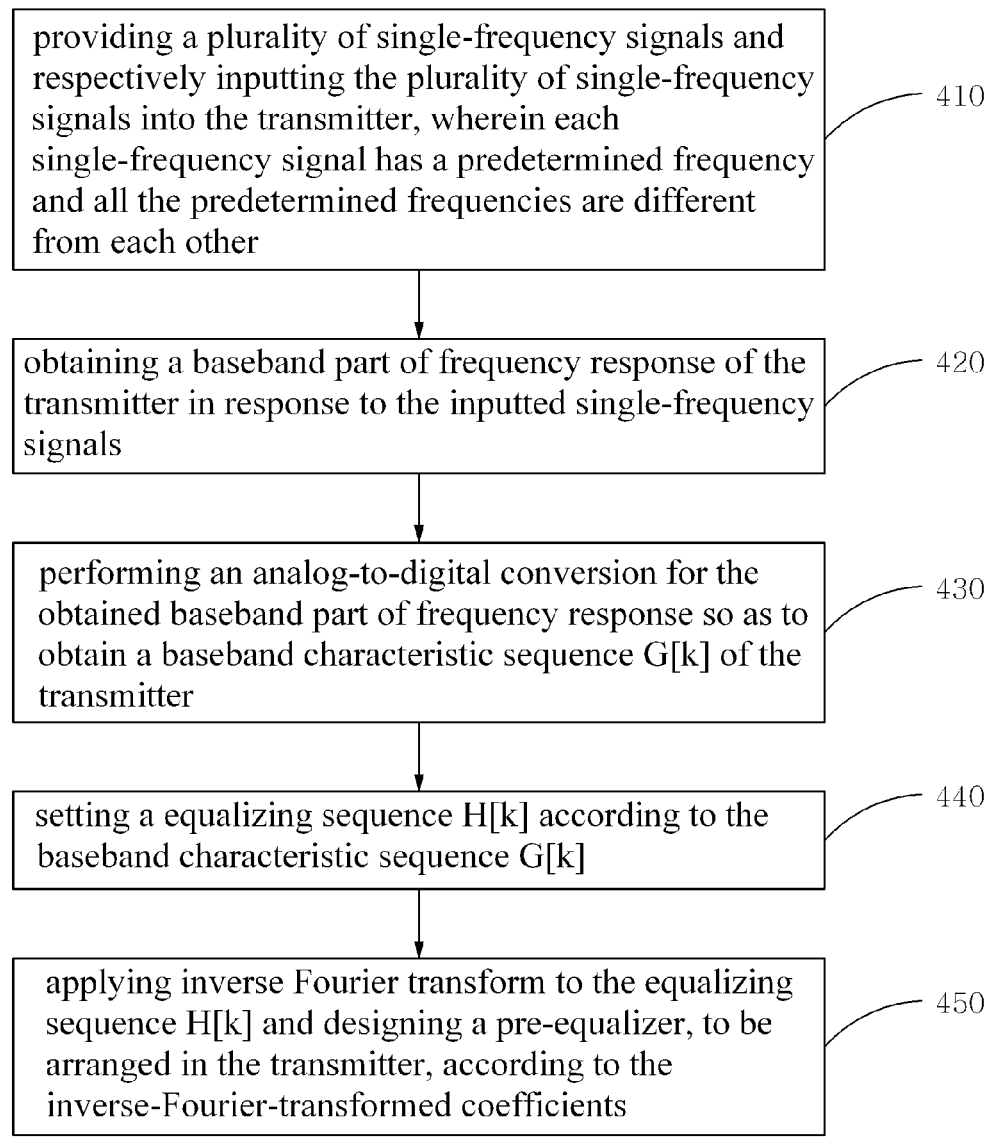
FIG. 3 shows a flow chart of an equalizing method according to another embodiment of the present disclosure.

FIG. 3 shows a flow chart of an equalizing method 400 according to another embodiment of the present disclosure. The equalizing method 400 is also used to equalize the transmission spectrum or impulse response of a wireless communication transmitter.

The equalizing method 400 includes the steps of: (Step 410) providing a plurality of single-frequency signals and respectively inputting the plurality of single-frequency signals into the transmitter, wherein each single-frequency signal has a predetermined frequency and all the predetermined frequencies are different from each other; (Step 420) obtaining a baseband part of frequency response of the transmitter in response to the inputted single-frequency signals; (Step 430) performing an analog-to-digital conversion for the obtained baseband part of frequency response so as to obtain a baseband characteristic sequence G[k] of the transmitter; (Step 440) setting a equalizing sequence H[k] according to the baseband characteristic sequence G[k]; and (Step 450) applying inverse Fourier transform to the equalizing sequence H[k] and designing a pre-equalizer, to be arranged in the transmitter, according to the inverse-Fourier-transformed coefficients; wherein k ∈ [0, K−1] or k=0, 1, 2, . . . , K−1, which denotes the sequence index in the frequency domain, and K is a predetermined number of samples. The equalizing sequence can be $$H[k] = \begin{cases} \frac{G[0]}{G[k]}, & \text{for } k = 0 \sim \frac{K}{4} \text{ and } \frac{3K}{4} \sim (K-1) \\ H\left[\frac{K}{2} - k\right], & \text{for } k = \left(\frac{K}{4} + 1\right) \sim \frac{K}{2} \\ H\left[\frac{3K}{2} - k\right], & \text{for } k = \left(\frac{K}{2} + 1\right) \sim \left(\frac{3K}{4} - 1\right) \end{cases}$$

or $$H[k] = \begin{cases} \frac{G[0]}{G[k]}, & \text{for } k = 0 \sim \frac{K}{4} \text{ and } \frac{3K}{4} \sim (K-1) \\ 1, & \text{for } k = \left(\frac{K}{4}+1\right) \sim \frac{K}{2} \\ 1, & \text{for } k = \left(\frac{K}{2}+1\right) \sim \left(\frac{3K}{4}-1\right) \end{cases}$$

Figure 4:
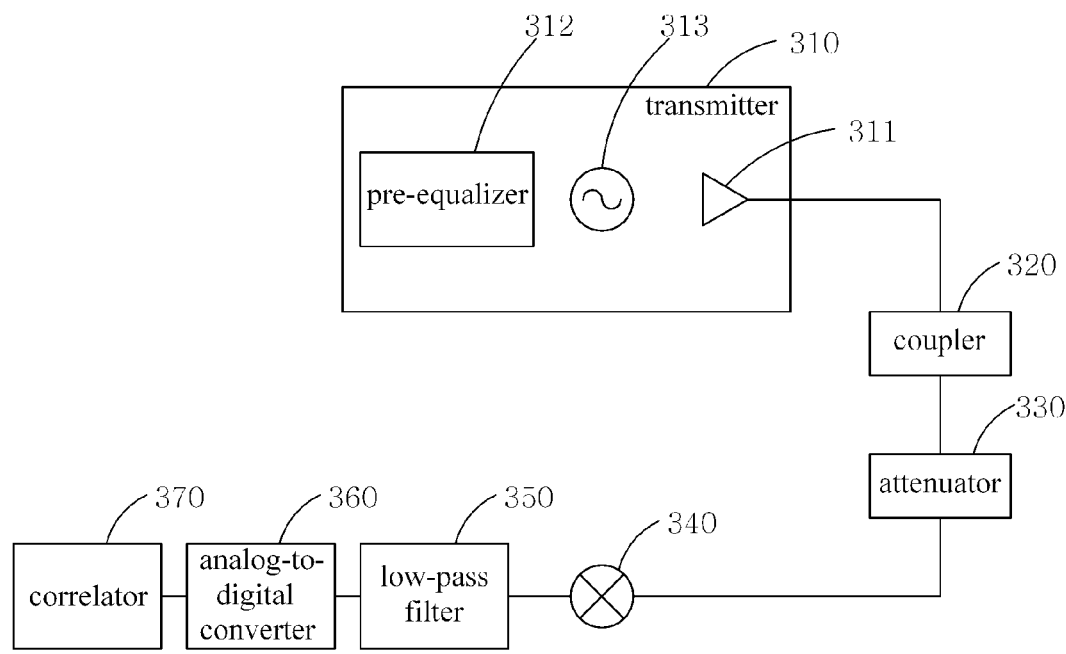
FIG. 4 is a block diagram showing a circuit used to implement the equalizing method of the present disclosure.

In one exemplary embodiment of the equalizing method 200/400, we can design and add a pre-equalizer 312 in a prior-art wireless communication transmitter. The pre-equalizer 312 can be used to equalize the transmission spectrum of the transmitter, so that the transmitter may have a flat transmission spectrum. For example, the equalizing method 400 can be applied to the Wi-Fi wireless local area network (WLAN), and FIG. 4 is a block diagram showing a circuit used to implement the equalizing method 400. The WLAN using 5-GHz Wi-Fi technology has a carrier frequency at 5 GHz with a baseband from −80 MHz to 80 MHz, i.e. a baseband width 160 MHz. Conventionally, a Wi-Fi transmitter 310 includes a power amplifier 311 of uneven characteristic frequency response, and its transmission spectrum can be referred to FIG. 1B, where $w_1$=−80 MHz and $w_2$=80 MHz.

A number of frequencies can be selected from the Wi-Fi baseband equidistantly or pre-determinedly. The frequencies are used to get or calculate frequency responses of the transmitter 310 at different frequencies before the pre-equalizer 312 has been added.

In the embodiment, a set of single tones or single-frequency signals are selected every 40 MHz. To avoid a direct-current signal (with zero frequency) from being selected, 5 MHz, 40 MHz, 80 MHz, −5 MHz, −40 MHz and −80 MHz are selected as frequencies of the set of single-frequency signals, to be individually applied to the transmitter 310. The transmitter 310 includes a local oscillator 313 which generates a single tone at the Wi-Fi carrier frequency 5 GHz. After each of the single-frequency signals coming from the output terminal of the transmitter 310 is processed by a coupler 320 and/or an attenuator 330, it can be mixed at a mixer 340 with the 5 GHz single tone from the local oscillator 313. The output of the mixer is then treated by the low-pass filter 350 that passes low-frequency part of the output. Thereby, we can calculate the baseband frequency response G(w) or the baseband part of impulse response of the transmitter 310 without the pre-equalizer 312 added. It should be understood that the quantity of the single-frequency signals may depend on the memory character of the transmitter 310. For a transmitter with a more memory character length, a more quantity of single-frequency signals is required in the embodiment. Moreover, the single-frequency signals may pass through a printed circuit broad (PCB) after being transmitted out.

After the baseband frequency response G(w) of the transmitter 310 is calculated, we can calculate the required characteristic frequency response of the pre-equalizer 312 in the Wi-Fi baseband according to the baseband frequency response G(w). Next, an analog-to-digital converter 360 is used to convert the baseband frequency response G(w) in the analog domain into a baseband response sequence G[k] in the discrete domain; wherein k=0, 1, 2, . . . , K−1, which denotes the sequence index in the frequency domain, and K is a predetermined number of samples. In the embodiment, the sampling rate can be two times the Nyquist rate. The characteristic sequence or equalizing sequence H[k] of the pre-equalizer 312 can be the inverse of G[k] in a frequency range inside the Wi-Fi baseband and 1 in a frequency range outside the Wi-Fi baseband. That is, the equalizing sequence H[k] can be expressed as $$H[k] = \begin{cases} \frac{G[0]}{G[k]}, & \text{for } k = 0 \sim \frac{K}{4} \text{ and } \frac{3K}{4} \sim (K-1) \\ H\left[\frac{K}{2}-k\right], & \text{for } k = \left(\frac{K}{4}+1\right) \sim \frac{K}{2} \\ H\left[\frac{3K}{2}-k\right], & \text{for } k = \left(\frac{K}{2}+1\right) \sim \left(\frac{3K}{4}-1\right) \end{cases}$$

Regarding the discrete Fourier transform, it converts a finite list of equally spaced samples of a function in the time domain into a list of characteristic coefficients of a finite combination of complex sinusoids in the frequency domain. By applying the inverse Fourier transform to the equalizing sequence H[k], we can obtain a set of inverse-Fourier-transformed characteristic coefficients for circuit design of the pre-equalizer 312. A correlator 370 doing with correlation-related operations can be used to perform the inverse Fourier transform of the equalizing sequence H[k] in the embodiment. The transmitter 310 may have a much flat transmission spectrum once the pre-equalizer 312 has been included in the transmitter 310.

Usually, the original samples are real numbers for the discrete Fourier transform, and the output characteristic coefficients are real numbers as well. In another embodiment, characteristic sequence, i.e. the equalizing sequence H[k], of the pre-equalizer 312 can be set in such a manner that the part of H[k] inside the Wi-Fi baseband is symmetrical to the part of H[k] outside the Wi-Fi baseband. For example, the equalizing sequence H[k] can be set as $$H[k] = \begin{cases} \frac{G[0]}{G[k]}, & \text{for } k = 0 \sim \frac{K}{4} \text{ and } \frac{3K}{4} \sim (K-1) \\ 1, & \text{for } k = \left(\frac{K}{4}+1\right) \sim \frac{K}{2} \\ 1, & \text{for } k = \left(\frac{K}{2}+1\right) \sim \left(\frac{3K}{4}-1\right) \end{cases}$$

The equalizing sequence H[k] can be used as the characteristic coefficients for designing the pre-equalizer 312, and their real parts and imaginary parts are equal to zero alternatively. Due to the symmetry of the characteristic coefficients, circuit complexity of the pre-equalizer 312 can be reduced to as that of a real-number filter. As compared with a complex-number filter, the pre-equalizer 312 of real-number filter has only 25% circuit complexity.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:
1. A method for equalizing a transmission spectrum of a wireless communication transmitter, comprising:
providing a plurality of single-frequency signals;
respectively inputting the plurality of single-frequency signals into the transmitter, wherein each single-frequency signal has a predetermined frequency and all the predetermined frequencies are different from each other;
loopbacking the plurality of single-frequency signals to an analog to digital converter so as to generate a plurality of digital loopback signals;
calculating a frequency response of the transmitter at a base band circuit according to the plurality of digital loopback signals; and
equalizing the transmission spectrum of the transmitter according to the frequency response of the transmitter;
wherein the method is for the Wi-Fi wireless local area network;
wherein each of the single-frequency signals has a frequency selected from the group consisting of 5MHz, 40MHz, 80MHz, -5MHz, -40MHz and -80MHz.

2. The method according to claim 1, wherein the transmitter includes a power amplifier having an uneven frequency response.

3. The method according to claim 1, wherein the transmitter includes a local oscillator and the step of calculating a frequency response of the transmitter at base band circuit includes:
mixing the output of the transmitter in response to the inputted single-frequency signals with a signal from the local oscillator; and
low-pass filtering the above mixing result.

4. A method for equalizing the transmission spectrum of a wireless communication transmitter, comprising:
providing a plurality of single-frequency signals and respectively inputting the plurality of single-frequency signals into the transmitter, wherein each single-frequency signal has a predetermined frequency and all the predetermined frequencies are different from each other;
obtaining a baseband part of a frequency response of the transmitter in response to the inputted single-frequency signals;
performing an analog-to-digital conversion for the obtained baseband part of the frequency response so as to obtain a baseband characteristic sequence G[k] of the transmitter;
setting a equalizing sequence H[k] according to the baseband characteristic sequence G[k]; and
applying inverse Fourier transform to the equalizing sequence H[k] and designing a pre-equalizer, to be arranged in the transmitter, according to inverse-Fourier-transformed coefficients;
wherein k ∈[0, K-1]and K is a predetermined number of samples, and the equalizing sequence is $$H[k] = \begin{cases} \dfrac{G[0]}{G[k]}, & \text{for } k = 0 \sim \dfrac{K}{4} \text{ and } \dfrac{3K}{4} \sim (K-1) \\ H\left[\dfrac{K}{2} - k\right], & \text{for } k = \left(\dfrac{K}{4} + 1\right) \sim \dfrac{K}{2} \\ H\left[\dfrac{3K}{2} - k\right], & \text{for } k = \left(\dfrac{K}{2} + 1\right) \sim \left(\dfrac{3K}{4} - 1\right) \end{cases}.$$

5. The method according to claim 4, wherein the transmitter includes a power amplifier having an uneven frequency response.

6. The method according to claim 4, wherein the method is for the Wi-Fi wireless local area network.

7. The method according to claim 6, wherein each of the single-frequency signals has a frequency selected from the group consisting of 5MHz, 40MHz, 80MHz, -5MHz, -40MHz and -80MHz.

8. The method according to claim 4, wherein the transmitter includes a local oscillator and the step of obtaining the baseband part of frequency response of the transmitter includes:
mixing the output of the transmitter in response to the inputted single-frequency signals with a signal from the local oscillator; and
low-pass filtering the above mixing result.

* * * * *